Sept. 26, 1950     R. T. MARETTE     2,523,770
RELEASABLE HOSE COUPLING
Filed July 22, 1948
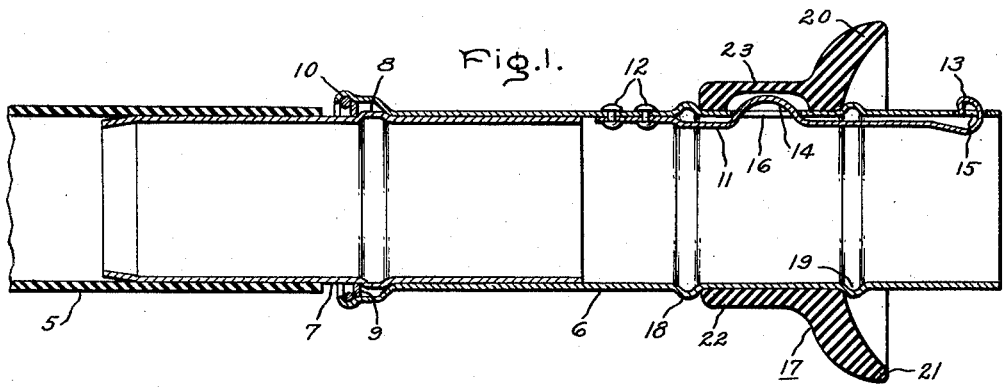
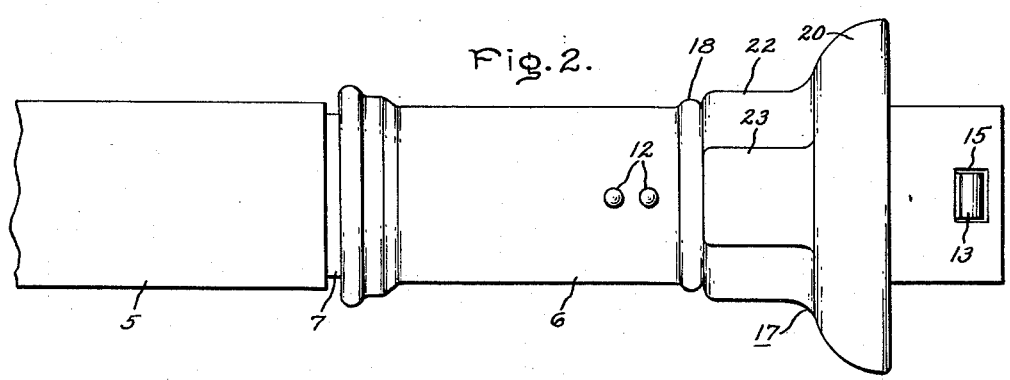
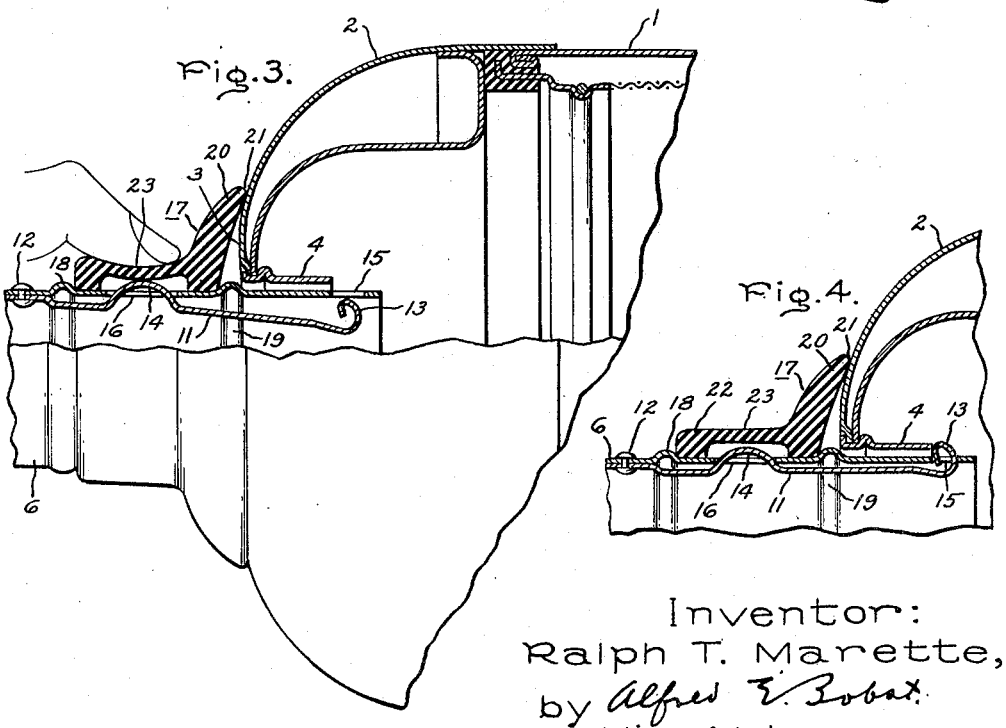
Inventor:
Ralph T. Marette,
by Alfred E. Bobst
His Attorney.

Patented Sept. 26, 1950

2,523,770

UNITED STATES PATENT OFFICE 2,523,770

RELEASABLE HOSE COUPLING

Ralph Thomas Marette, Cleveland Heights, Ohio, assignor to General Electric Company, a corporation of New York Application July 22, 1948, Serial No. 40,109

5 Claims. (Cl. 285—174)

My invention relates to a coupling of the type generally used between the body of a vacuum cleaner and an attachment hose therefor. It is desirable that such a coupling be substantially air-tight and positive in order to withstand the strain of pulling the vacuum cleaner body around. It is also desirable that the hose be quickly and easily attached to or detached from the cleaner body. Furthermore, the connection should be inexpensive and easy to manufacture.

Many connections known before my invention suffered from the defect that there was no way of easily determining whether or not they were properly engaged. A special object of my invention is to provide a means for indicating to the user by sight and by feeling whether or not the connection is properly made.

The objects of my invention are accomplished by providing the tube or hose with a spring latch which releasably engages inside of the opening in a cleaner body. A flexible and resilient air sealing cover or collar surrounds the tube near its end, and this collar has an outwardly flared or flanged portion which resiliently presses against the face of the cleaner body around the hose coupling of the body when the tube latch is engaged. The same air seal cover may be used to seal the tube around the opening for the operating button of the latch.

Other objects and the details of that which I believe to be novel and my invention will be clear from the following description and claims taken with the accompanying drawing in which is illustrated an example of the device embodying the present invention and incorporating the flexible resilient collar member.

In the drawing, Fig. 1 is a cross-section of the end of a hose and coupling tube as it would appear detached from a cleaner with which it might be used; Fig. 2 is a plan view of the hose and coupling tube of Fig. 1; Fig. 3 is a cross-section similar to Fig. 1 but showing the coupling tube in one position it may occupy with relation to a vacuum cleaner tank or body; Fig. 4 is a cross section similar to Fig. 3 but showing the parts in a different position.

Although I will describe and show my invention in connection with a vacuum cleaner of the tank type, it is obvious that the invention may be used with cleaners of the industrial type or with upright cleaners. Furthermore, my coupling need not be used only as a suction coupling, but may be used also as a pressure coupling.

In the example shown, I have indicated a cleaner body 1 with an end cap 2 which has a substantially flat or planate face 3 in which is the customary suction or intake passage. I prefer to make this passage in the form of a short tube 4 which is held in place in the end cap in any suitable fashion. It will be noted that this tube 4 is secured rigidly to the face of the end cap at one end and extends freely within the cleaner body at the other end. It can thus function as a guide for insertion of the end of the attachment hose or tube. Within the cleaner body are mounted the usual motor and vacuum-producing means, such as a fan. A dust collector or filter is also provided, as is readily understood.

For cooperation with the opening or passageway in the face of the vacuum cleaner body, I provide the usual flexible attachment hose 5. Fastened to this hose is a tube 6 which carries most of the essential elements of my invention. The fastening between this flexible hose and the coupling tube may be made in any suitable fashion, although I have shown a swivel tube 7 which may be inserted within the hose and cemented or otherwise secured thereto. This swivel tube is rotatably connected to the connection tube in the preferred embodiment of my invention. I have shown a shoulder 8 on the swivel tube which engages with a washer or gasket 9 which in turn is held in place by a split ring 10 seated within a groove at the end of the connection tube.

Near the other end of the connection tube 6, I provide a spring latch 11 made preferably from a strip or leaf of spring metal. One end of this latch is secured to the inside of the coupling tube as by rivets 12, and the other or free end of the latch is provided with a detent 13. This detent is releasably engageable with the end of the short tube 4 in the end cap of the cleaner, as shown clearly in Figs. 3 and 4. In order to retract the detent and operate the latch, I provide a push button shown here as an integral bump or formation 14 on the latch member. Both the detent and the push button must extend outside of the coupling tube for proper operation. For this reason, holes or apertures 15 and 16, respectively, are provided in a wall of the coupling tube. As shown in an exaggerated fashion in the drawing, the coupling tube has a sliding fit within the opening in the end cap of the cleaner. When this tube is pushed within the cleaner, the detent is retracted by engagement with the tube 4 until it reaches its fully seated position as shown in Fig. 4. After this, when it is desired to remove the attachment hose, it is necessary to release the latch by pushing the button.

The heart of my invention is in the collar 17 which is made preferably of rubber or other resilient, as well as flexible, material. This collar is slipped on to the end of the connection tube and has a tight fit therewith. It is prevented from sliding in either direction after assembly by suitable means, such as the ribs or ridges 18 and 19 on the connection tube. The rib 19 also can act as a stop to prevent excessive insertion of the connection tube within the end cap of the cleaner. Because of the tight fit of the collar around the connection tube, an air seal is provided at this point. Extending outwardly from the collar is a flared slightly dished portion 20 which has a sealing edge 21. When the connection tube is pushed into place on the cleaner, this sealing edge engages with and is compressed against the planate face on the cleaner body. Friction between the sealing edge 21 and the face of the body will prevent rotation of the parts when they are properly engaged.

Because of the dish shape of this annular flange 20, a certain latitude of movement is permitted between the connection tube and the face of the cleaner body without destroying the good air seal at the edge 21. When the detent of the latch is disengaged, the edges of the flared portion tend to return to their original dished position, and thereby resiliently press the tube end away from the cleaner body face to eject the tube from the cleaner. This self-ejecting feature is advantageous in that the user of the equipment is never in doubt as to whether or not the connection is made properly. If properly engaged, the latch holds the hose end securely in sealing position. If the latch is not properly engaged, the user is warned by both sight and feeling that the latch connection or the air seal is not functioning.

The collar 17 is also preferably extended into a cylindrical portion 22. This cylindrical extension surrounds and covers the tube to seal the opening 16 through which the push button 14 extends. An enlargement or pocket 23 may be provided in this cylindrical section to clear the push button and to indicate to the user that portion of the collar which must be depressed in order to retract the latch.

It will be seen that I have provided a simple and effective coupling and air seal which can be easily attached or detached as occasion requires. If the coupling tube is not properly inserted within the opening in the cleaner end, the resilient collar will push this tube away from the cleaner and thus indicate that a proper connection is not made.

As will be evident from the foregoing description, certain aspects of my invention are not limited to the particular detailed construction of the example illustrated, and I contemplate that various and other modifications and applications of the invention will occur to those skilled in the art. It is, therefore, my intention that the appended claims will cover such modifications and applications as do not depart from the true spirit and scope of my invention.

What I claim as new and desire to secure by Letters Patent of the United States is:

1. A releasable coupling of the type used between a cleaner body and an attachment hose, comprising a substantially planate face on the body, a passageway through the face, an open-ended tube on the attachment hose adapted slidably to fit within the passageway, a spring latch carried by the tube near its open end, a detent on the latch releasably engageable with the passageway, a push button on the latch for releasing the detent, a resilient collar in air sealing engagement around the tube near its end covering said push button, an outwardly flared, dished portion on said collar, and an air sealing edge on said flared portion adapted resiliently to engage and seal against the planate face of the body around the passageway when the tube is inserted in and the latch detent engages with the passageway said dished portion resiliently biasing the tube to slide away from the cleaner body face when the detent is disengaged from the passageway.

2. A releasable coupling of the type used between a cleaner body and an attachment hose, comprising a substantially flat face on the body, a passageway through the face, an open-ended tube on the attachment hose adapted slidably to fit within the passageway, a leaf spring latch carried by the tube near its open end, a detent on one end of the latch releasably engageable with the passageway, a push button formation integral with the latch for releasing the detent, said formation extending through an opening in a side of the tube, a resilient collar in air sealing engagement around the tube near its end, an outwardly flared portion on said collar, said flared portion adapted resiliently to engage the flat face of the body for air sealing therewith when the tube is inserted in and the latch detent engages with the passageway, and a cylindrical extension on the collar surrounding and covering the push button and adjacent portions of the tube for air sealing the opening through which the button extends.

3. A releasable coupling of the type used between a cleaner body and an attachment hose, comprising a face on the body, a passageway through the face, an open-ended tube on the attachment hose adapted slidably to fit within the passageway, a latch carried by the tube near its open end, releasably engageable with the passageway, a resilient collar on the tube near its end in air sealing engagement therewith, an outwardly flared, dished portion on said collar, with an edge adapted resiliently to press and seal against the face of the body when the tube is inserted in and the latch is engaged with the passageway, said dished portion resiliently biasing the tube to slide away from the cleaner body face when the latch is disengaged from the passageway.

4. An attachment hose coupling for a vacuum cleaner body, comprising a face on the cleaner body, a rigid tube secured at one end to the face and at the other end extending freely within the cleaner body, a second tube on the attachment hose of a size to slide freely into and out of the first tube, a spring strip secured to the inside of the second tube and carrying a detent extending outside of the second tube releasably to engage the free end of the first tube, a push button formation on the spring strip for retracting the detent within both tubes to release the detent from the first tube, and a combined air seal and biasing member for the coupling comprising a resilient annular flange surrounding the second tube in air sealing engagement therewith, said flange being positioned and shaped to be compressed against the face on the cleaner body when said detent is engaged with the end of the first tube.

5. A releasable coupling of the type used between a vacuum cleaner body and an attachment hose therefor, comprising an outer face on the cleaner body, a passageway through the face, an open ended tube on the attachment hose adapted slidably to fit within the passageway, a detachable connection between said tube and said passageway, a resilient collar on the tube spaced from its open end, an outwardly flared dished portion on said collar with an edge adapted resiliently to press and seal against the face of the cleaner body when the tube is inserted in and is connected to said passageway, whereby said dished portion resiliently biases the tube to slide away from the cleaner body face when the tube is detached from the passageway.

RALPH THOMAS MARETTE.

REFERENCES CITED

The following references are of record in the file of this patent:

UNITED STATES PATENTS

| Number | Name | Date |
| --- | --- | --- |
| 2,420,866 | Coss | May 20, 1947 |

FOREIGN PATENTS

| Number | Country | Date |
| --- | --- | --- |
| 16,257 | Great Britain | July 25, 1907 |